(No Model.)

I. KOHN.
CLOTHES LINE FASTENER.

No. 338,159. Patented Mar. 16, 1886.

WITNESSES

INVENTOR
Ignaz Kohn
By his Attorneys

UNITED STATES PATENT OFFICE.

IGNAZ KOHN, OF NEW YORK, N. Y., ASSIGNOR OF ONE-FOURTH TO JACOB ZUBER, OF SAME PLACE.

CLOTHES-LINE FASTENER.

SPECIFICATION forming part of Letters Patent No. 338,159, dated March 16, 1886.

Application filed March 19, 1885. Serial No. 159,375. (No model.)

*To all whom it may concern:*

Be it known that I, IGNAZ KOHN, of the city, county, and State of New York, have invented certain new and useful Improvements in Clothes-Line Stretchers, of which the following is a specification.

This invention has reference to an improved attachment to clothes-lines by which the same can be quickly and conveniently stretched taut for use or released after use, so as to prevent it from being contracted and torn in rainy weather.

The invention consists of a clothes-line attachment formed of a pulley and a pulley-block, which latter is provided with eyes and curved arms at both ends, the arms being bent in opposite directions for winding the ends of the clothes-line around the same. One end of the clothes-line is attached to one eye of the block, while the other end is passed over the pulley and provided with a hook at the end that engages the eye at the opposite end of the pulley-block.

Figure 1:
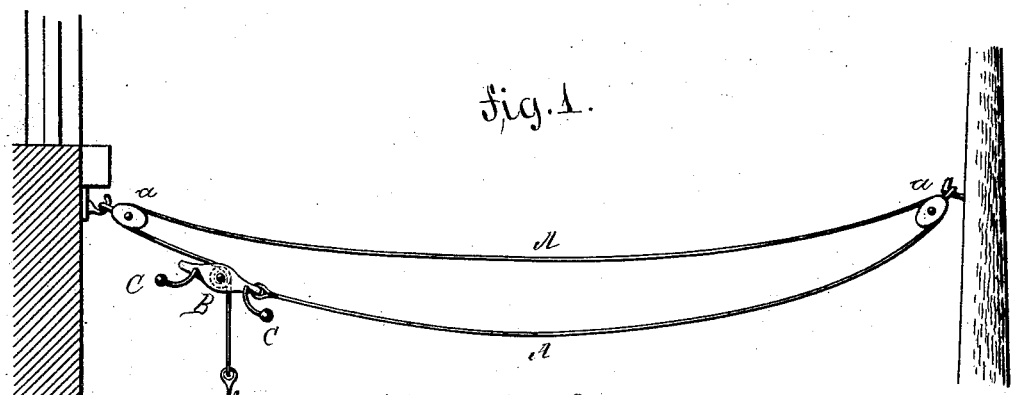
Figure 2:
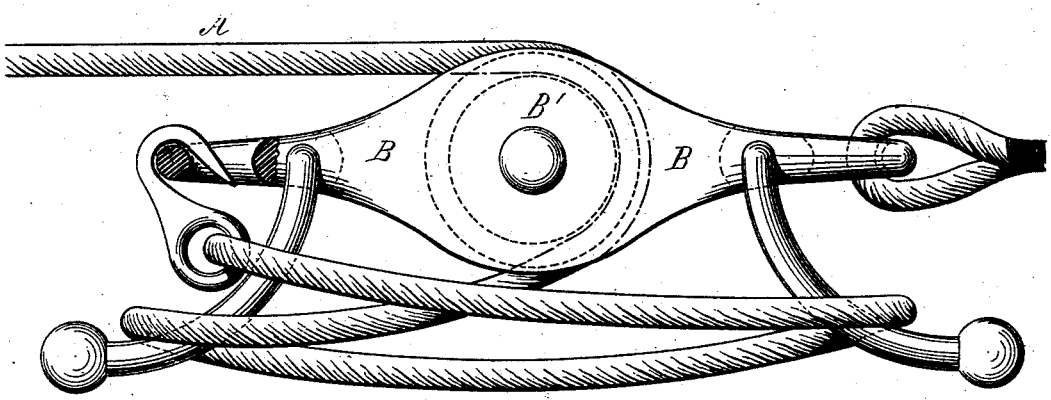
Figure 3:
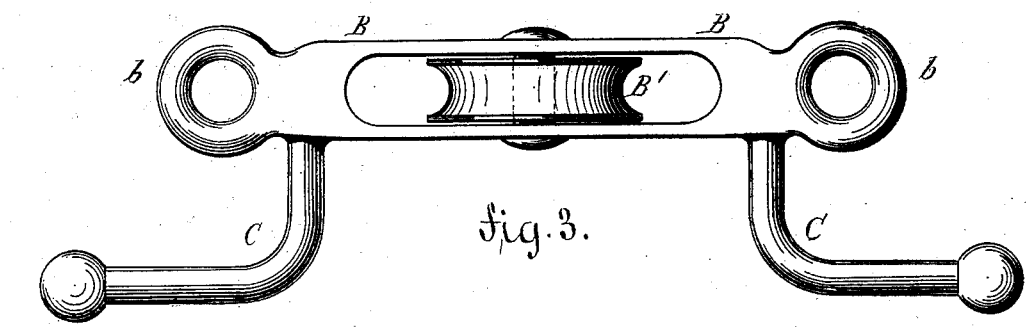

In the accompanying drawings, Figure 1 represents a side elevation of a clothes-line with my improved attachment. Fig. 2 is a side elevation of the attachment, and Fig. 3 is a top view of the same drawn on a longer scale.

Similar letters of reference indicate corresponding parts.

A in the drawings represents a clothes-line, which is hung in the usual manner to pulleys *a a* at both ends of the same. The ends of the clothes-line A, instead of being tied together, are applied to my improved attachment, which consists of a pulley-block, B, having at its center a pulley, B'. The pulley-block B is provided with an eye, *b*, at each end, and with curved arms C C, which are bent in downward and opposite directions away from each other, as shown in Figs. 2 and 3. One end of the clothes-line A is attached to the eye *b* at one end of the pulley-block B, while the other end of the clothes-line is passed over the pulley and provided with a hook, D, at the end, that serves not only as a stop to prevent the escape of the clothes-line from the pulley, but also as a means of fastening the end of the clothes-line into the eye *b* at the opposite end of the pulley-block B.

When it is desired to stretch the line tightly, to hang up the clothes, the hook is taken hold of and the loose end of the line pulled over the pulley B, after which the end of the line is wound around the arms C C, and the hook D finally applied to the eye *b*, as shown in Fig. 2. In this manner a very reliable connection of the clothes-line with the pulley-block is obtained, by which the line can be readily stretched or loosened by simply attaching the loose end of the line to or releasing it from the pulley-block.

The pulley-block, with its arms and eyes, is preferably made of malleable cast-iron, and forms a cheap and durable attachment to clothes-lines, by the use of which the contracting and tearing of the same when getting wet by rain may be prevented.

Having thus described my invention, I claim as new and desire to secure by Letters Patent—

1. The combination of a clothes-line and its supporting-pulleys, a hook attached to one end of the line, a pulley, and a pulley-block having bent arms extending in opposite directions, and eyes at both ends of the block for attaching the ends of the clothes-line, substantially as described.

2. An attachment for clothes-lines, consisting of a pulley and a pulley-block having bent arms extending in opposite directions to each other, and eyes at both ends of the block, substantially as set forth.

In testimony that I claim the foregoing as my invention I have signed my name in presence of two subscribing witnesses.

IGNAZ KOHN.

Witnesses:
CARL KARP,
ERNST WOLFF.